UNITED STATES PATENT OFFICE.

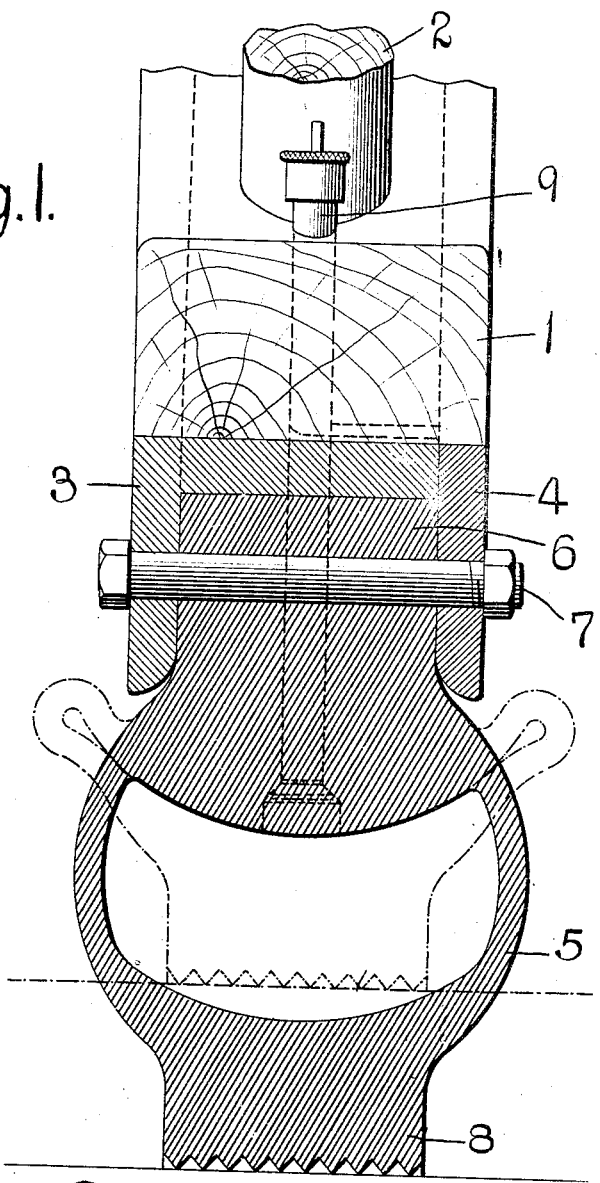

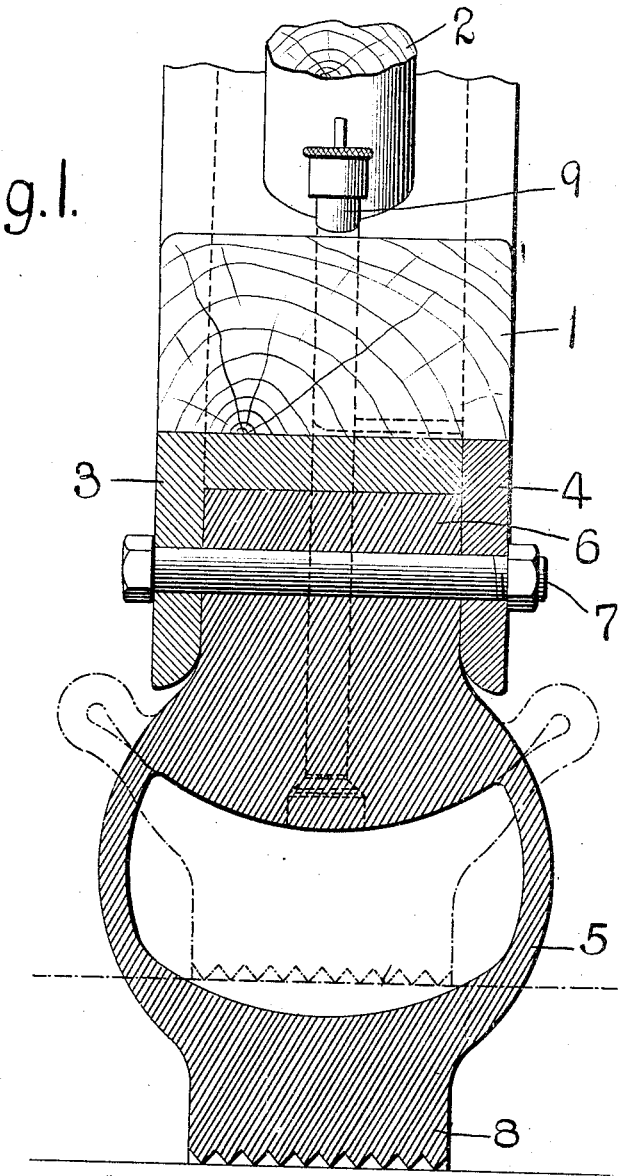

THOMAS FURLONG, OF ST. LOUIS, MISSOURI.

WHEEL-TIRE.

No. 824,476.　　　Specification of Letters Patent.　　　Patented June 26, 1906.

Application filed October 2, 1905. Serial No. 280,993.

*To all whom it may concern:*

Be it known that I, THOMAS FURLONG, a citizen of the United States, residing at St. Louis, Missouri, have invented a certain new and useful Improvement in Wheel-Tires, of which the following is a full, clear, and exact description, such as will enable others skilled in the art to which it appertains to make and use the same, reference being had to the accompanying drawings, forming part of this specification, in which—

Figure 1 is a sectional view through a portion of my improved wheel, and Fig. 2 is a bottom plan view of the tire.

This invention relates to a new and useful improvement in wheels designed especially for automobiles, the tire being designed as an improvement upon the tire shown in United States Letters Patent No. 582,194, granted to me February 11, 1897.

The object of my present invention is to enable the tire to be readily introduced upon and removed from the rim of the wheel, and in the event of a puncture occurring in the tire so as to release the confined air, the tread of the tire will be supported by the base portion of the tire, thus enabling the wheel to be used temporarily without destroying the tire or injuring the rim.

In the drawings, 1 indicates the wooden felly, and 2 are the spokes.

3 indicates an L-shaped metallic rim secured to the felly, and 4 is a removable flange on said rim.

The tire 5 is essentially circular in cross-section; but from the inner periphery thereof extends a base portion 6, provided with transverse openings through which securing-bolts 7 are passed, said bolts also serving to hold the removable flange 4 in place. The solid inner portion of the tire extends into the circular portion some distance, the lower face of said solid portion being convex, as shown. From the outer periphery of the tire extends a solid tread projection 8, having a flat face, said face being pitted or honeycombed in substantially the manner shown in my aforesaid patent, No. 582,194. The inner surface of the tire above this tread portion is preferably concave, the radii of the curve being substantially the same as the radii of the curve of the upper convex base portion.

9 indicates the tube of an inflating-valve having a cap on its inner end, said tube extending to the rim and felly of the wheel, as is well understood.

To place the tire on the wheel, the openings in the base portion are alined with the openings in the flange of the metallic rim, after which the bolts are slipped through and the removable flange 4 placed in position, nuts being screwed upon the ends of the bolt to hold said flange in place and clamp the base portion of the tire in position. The tire is then inflated in the usual manner. In the event that the tire is punctured the side walls thereof will fold, as shown in dotted lines in Fig. 1, so as to permit the concave inner face of the tread portion to rest upon the convex face of the base portion, enabling the wheel to be run without danger of cutting the comparatively thin side walls and without injuring the rim or felly.

I am aware that minor changes in the construction, arrangement, and combination of the several parts of my device can be made and substituted for those herein shown and described without departing from the nature or principle of my invention.

Having thus described the invention, what is claimed as new, and desired to be secured by Letters Patent, is—

1. An inflatable tire comprising a solid base portion having a flat face which bears upon the face of the rim of the wheel upon which the tire is placed, a solid tread portion having a flat outer face and being of approximately rectangular shape in cross-section, and comparatively thin side walls connecting the base and tread portions, the inner face of the base portion being convex and the inner face of the tread portion being concave so that when the tire is deflated the tread portion will rest squarely upon the base portion and thus produce practically a solid tire of rectangular shape in cross-section; substantially as described.

2. In a wheel, the combination with a flat metallic rim having a straight flange and a removable coöperating flange, of an inflatable tire having a solid base portion of approximately rectangular shape in cross-section which rests on the flat face of the wheel-rim and is confined between the flanges thereof, said base portion being of greater depth than the height of said flanges, a solid rectangular-shaped tread portion of approximately the same width as the base portion, and walls of comparatively thin material connecting the base and tread portions, the inner face of the base portion being convex and the inner face of the tread portion being concave so that when the tire is deflated the tread portion will rest squarely upon the base portion and all liability of the flanges of the rim of the wheel damaging the connecting walls of the tire will be obviated; substantially as described.

In testimony whereof I hereunto affix my signature, in the presence of two witnesses, this 30th day of September, 1905.

THOMAS FURLONG.

Witnesses:
F. R. CORNWALL,
GEORGE BAKEWELL.